Nov. 1, 1938.  C. S. BRYE  2,135,099
FEED MECHANISM FOR GRAIN SEPARATORS
Filed March 8, 1937
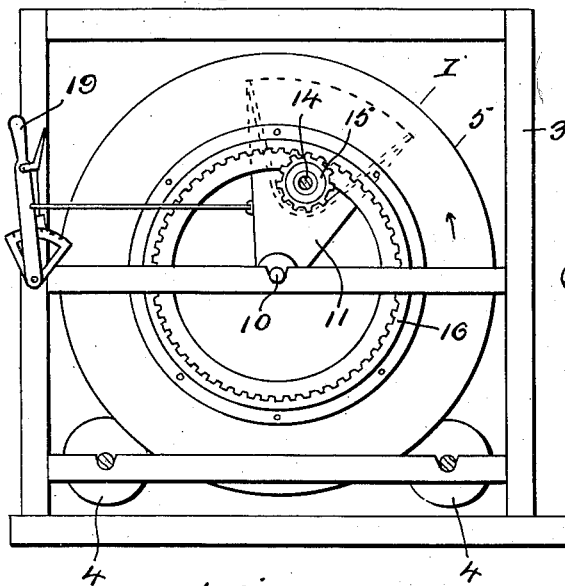
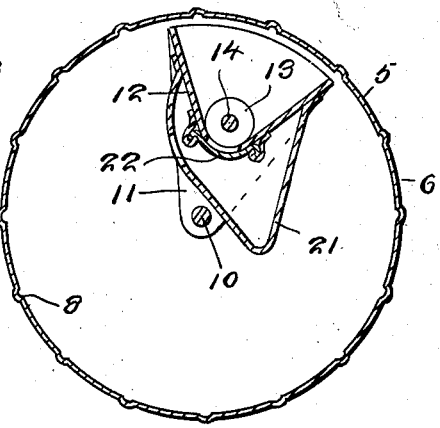
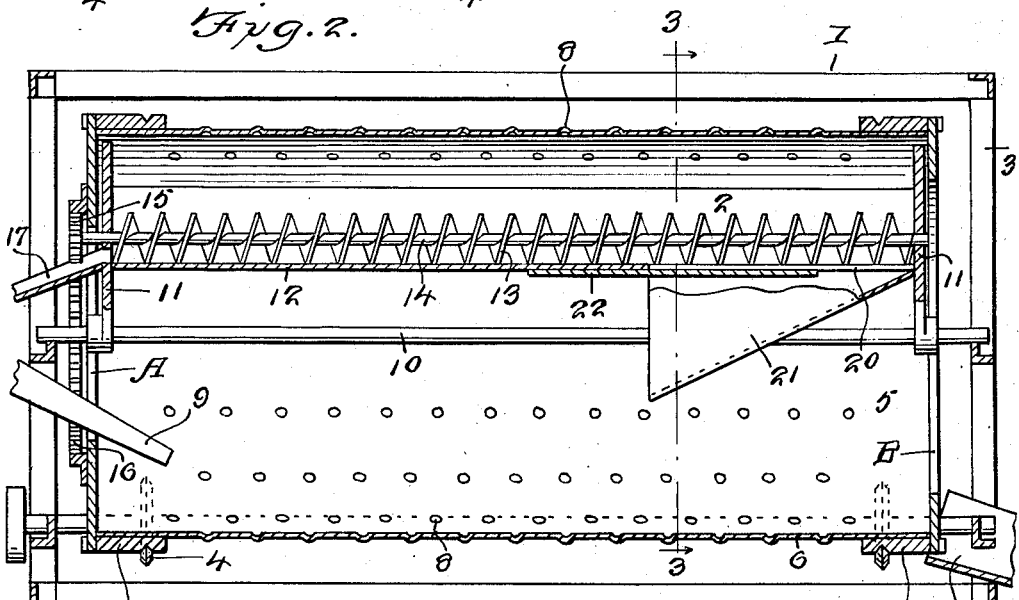
Carl S. Brye
INVENTOR
BY Victor J. Evans & Co.
ATTORNEYS Patented Nov. 1, 1938

2,135,099

UNITED STATES PATENT OFFICE 2,135,099

FEED MECHANISM FOR GRAIN SEPARATORS

Carl S. Brye, Minnewaukan, N. Dak.

Application March 8, 1937, Serial No. 129,740

1 Claim. (Cl. 209—95)

This invention relates to a feed mechanism especially adapted for receiving and conveying from a separator unit of a seed separator, seeds of a selected kind, while the chaff, undesirable seed and foreign matter is delivered at one end of the separator, some of which may reach the feed mechanism during the operation of the separator.

The primary object of this invention is the provision of means for returning to the separator unit from the feed mechanism for reseparation any chaff and foreign material along with some of the selected seeds so that the delivery made by the feed mechanism will be only of seeds of a selected kind free of undesirable material and other seeds.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is an end elevation illustrating a seed separator to which my invention is adapted.

Figure 2 is a vertical sectional view illustrating the feed mechanism for receiving and conveying from the separator selected seeds equipped with my invention.

Figure 3 is a transverse sectional view taken on the line 3—3 of Figure 2.

Figure 4 is a fragmentary top plan view showing a portion of the feed mechanism with a slot in the trough thereof.

Referring in detail to the drawing, the numeral 1 indicates a conventional type of seed separator and 2 a feed mechanism employed for receiving and conveying from the separator seeds of a selected kind. The separator 1 includes a supporting structure 3 equipped with rollers 4 for rotatably supporting a separator unit 5. The separator unit includes a sleeve 6 equipped with bearing portions 7 to engage with the rollers 4 and is provided with a series of sumps 8. The sleeve 6 is supported horizontally and the forward or receiving end is designated by the character A while the rear or discharge end is designated by the character B. Seeds which may contain chaff and other foreign material are delivered into the separator unit at the end A by a chute or any other well known device indicated by the character 9. Power is delivered to the rollers 4 in any well known manner so as to cause rotation of the separator unit.

A shaft 10 is journaled on the frame 3 and extends through the separator unit and has secured thereon brackets 11 forming a part of a trough 12. The trough 12 forms part of the feed mechanism 2. Said feed mechanism also includes a worm conveyor 13, the shaft of which is indicated by the character 14 and has secured thereto a gear 15 meshing with a ring gear 16 secured on the separator unit so that during the rotation of the separator unit the worm conveyor is caused to rotate for feeding from the trough 12 seeds received from the separator unit to a discharge chute 17.

During the operation of the separator unit seed and other foreign material fed into the separator unit work towards the end B and the chaff and other foreign material escapes from the separator unit at the end B into a chute 18. The rotation of the separator unit carries seeds of a selected kind upwardly and deposits said seed into the trough 12. At the rear end or end B of the separator unit a certain amount of the foreign material or chaff may be taken up and delivered into the trough and in order that this foreign material may not be discharged into the chute 17 my invention is employed and which will be hereinafter more fully described in detail.

An adjusting means 19 is mounted on the frame 3 and is connected to the trough 12 for varying the position of the trough in the separator unit. The foregoing description sets forth a well known type of seed separator and its operation in order that my invention may be clearly understood.

In adapting my invention to a seed separator of the kind described the trough 12 has formed therein a slot 20. This slot 20 is located at the rear portion of the separator unit or extends from the end B thereof for a limited distance towards the end A and is located in the portion of the trough 12 which may receive a certain amount of chaff and other foreign matter from the separator unit during the operation of the separator. Secured to the trough 12 and underlying the slot 20 is a chute 21. The chute 21 inclines towards the forward or receiving end A of the separator unit so that any seeds, chaff and foreign material received in the trough 12 and passing through the slot 20 will be delivered into the separator unit for reseparation so that seeds delivered into the chute 17 by the feed mechanism will be of a selected kind and free of chaff and other foreign material. A closure 22 is slidably mounted on the trough 12 of the feed mechanism for regulating the size of the slot 20 so that the operator may at any time increase or decrease the size of the slot in accordance with the amount of foreign material being deposited into the feed mechanism from the separator unit.

In operation, at the end B where the chaff and foreign material discharges there is a tendency of such foreign material to back up in the separator unit and a certain amount thereof to be carried upwardly by the separator unit and deposited along with seeds of a selected kind into the feed mechanism. The slot 20 and chute 21 being provided will receive this foreign material and some of the selected seeds and redirect said foreign material and seeds into the separator unit towards the receiving end A thereof whereby a reseparation will be provided consequently the delivery made by the free mechanism will be only seeds of a selected kind free of foreign material.

What is claimed is:

In combination with a seed separator having a horizontally disposed rotatable separator unit having head and discharge ends and including a feed means at the head end of said unit for material to be classified, and a discharge means at the discharge end of said unit for discharging certain classified material; a feed mechanism operating in said unit to receive and convey therefrom material of a selected character and comprising a horizontally disposed trough having a feed conveyer operable therein for feeding material therethrough, said trough fashioned with a discharge port in the floor thereof adjacent the discharge end of said unit, a closure slidably mounted on said trough floor for regulating the size of said port, a subjacent chute secured to said trough adjacent the discharge end of said unit and underlying said port for receiving material discharged therethrough, said chute having a bottom inclining downwardly towards the head end of said unit and having the lower end of the chute bottom terminating between said head and discharge ends of said unit whereby material discharged from said chute will be deposited on the peripheral wall of said unit away from said discharge end thereof to bring about reseparation of said deposited material.

CARL S. BRYE.